(No Model.) 3 Sheets—Sheet 1.

L. G. CLAUDE.
MANUFACTURE OF HORSESHOES.

No. 324,361. Patented Aug. 18, 1885.

WITNESSES:
J. B. Bolton
Geo. H. Fraser

INVENTOR:
Louis G. Claude
By his Attorneys,
Burke, Fraser & Connett (No Model.) 3 Sheets—Sheet 2.
L. G. CLAUDE.
MANUFACTURE OF HORSESHOES.
No. 324,361. Patented Aug. 18, 1885.
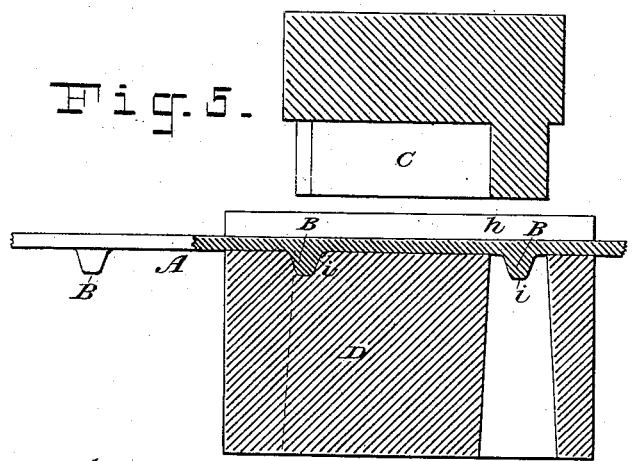
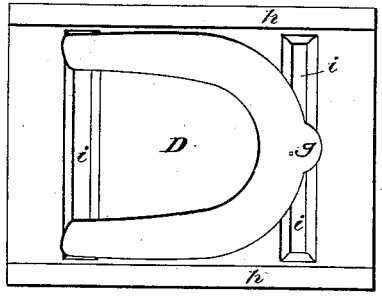
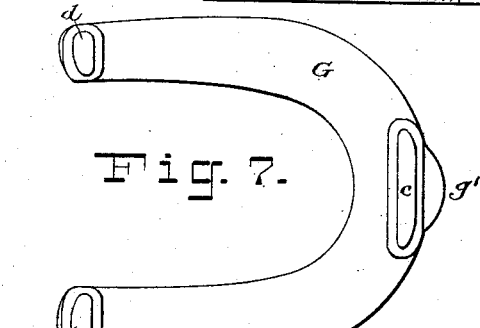
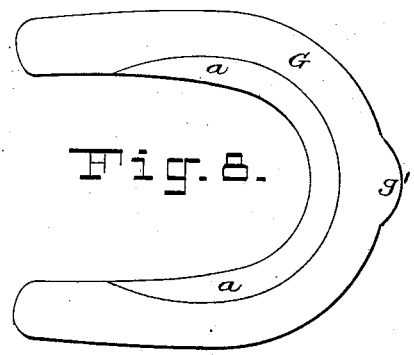
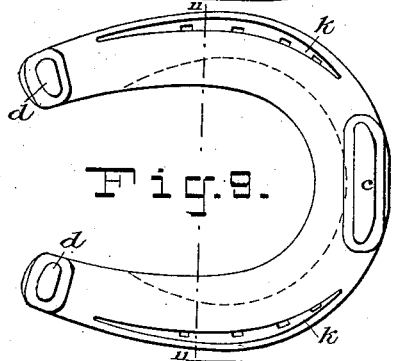
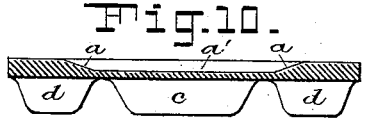
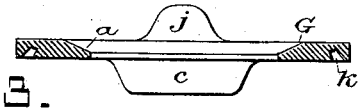
WITNESSES:
E. B. Bolton
Geo. H. Fraser.
INVENTOR:
Louis G. Claude,
By his Attorneys,
Burke, Fraser & Connett (No Model.)  3 Sheets—Sheet 3.
L. G. CLAUDE.
MANUFACTURE OF HORSESHOES.
No. 324,361. Patented Aug. 18, 1885.
Fig. 12.
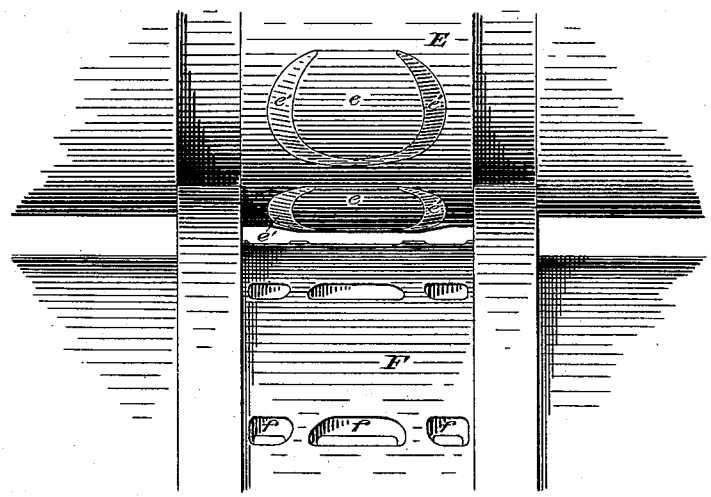
Fig. 14.
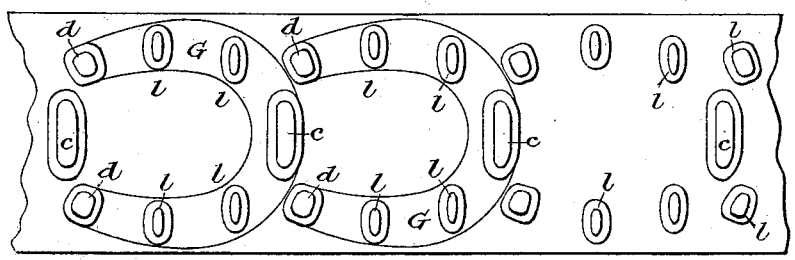
Fig. 15.
Fig. 16.
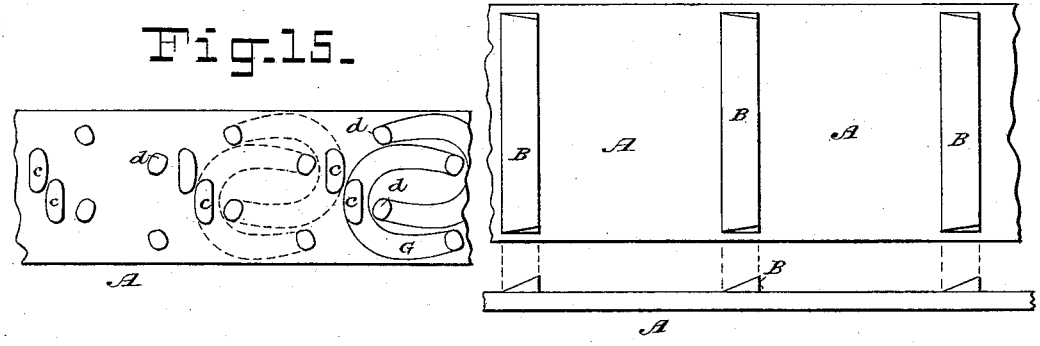
Fig. 17.
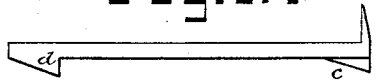
WITNESSES:
E. B. Bolton
Geo. H. Fraser.
INVENTOR:
Louis G. Claude
By his Attorneys,
Burke, Fraser & Connett

UNITED STATES PATENT OFFICE.

LOUIS G. CLAUDE, OF NEW YORK, N. Y., ASSIGNOR, BY MESNE ASSIGN-
MENTS, TO THE RUSSELL HORSESHOE COMPANY, OF SAME PLACE.

MANUFACTURE OF HORSESHOES.

SPECIFICATION forming part of Letters Patent No. 324,361, dated August 18, 1885.

Application filed December 20, 1884. (No model.)

*To all whom it may concern:*

Be it known that I, LOUIS G. CLAUDE, a citizen of the United States, residing in the city, county, and State of New York, have invented certain new and useful Improvements in the Manufacture of Horseshoes with Solid Calks, of which the following is a specification.

The object of my present invention is to provide an improved and simplified method of manufacturing, by machinery, horseshoes with solid calks.

Prior to my invention two ways have been known for making solid-calk shoes. According to the first method a straight bar is passed through grooved rolls, by which it is reduced in thickness, except at intervals where projections are left to form the calks. The bar is then cut into lengths, each length having a projection in its middle for the toe-calk, and at each end for the heel-calks. The bar is then bent around a former to the proper shape, and is then concaved by being passed between rotary or reciprocating dies. The creases are made either in the straight bar while the calks are being formed, or in the curved shoe while the concave is being made. According to the second method a bar of iron is first rolled, having a rib along each edge, and from this bar the shoe-blanks are punched out side by side, the portions of each blank at the toe and heel cut from the said rib constituting the calks. The sides of the blank are then bent outward to the proper curved shape. The creases are formed and the toe-clip is bent up. This method is subject to the practical disadvantage that the grain of the metal extends transversely of the shoe, thereby further weakening the side portions thereof, which are in any case the weakest portions by reason of their thinness.

By my improved method of manufacture a plate or flat bar is rolled with ribs or calks projecting from its under surface, and the shoes are punched out with their longitudinal axes extending longitudinally of the bar, and in such order that the said ribs or projections come in proper position to form the calks. The bar is also formed with beveled depressions or "concaves" on its upper side in proper position relatively to the calks to form the usual concaves on the finished shoes, thus avoiding the operation of concaving by a subsequent manipulation.

Figure 1 of the accompanying drawings is a plan of the under side of the bar from which the shoes are to be punched out, showing the projecting calks. Fig. 2 is an edge elevation thereof, partly in longitudinal mid-section. Fig. 3 is a plan of the upper side of the bar, showing the concaves. Fig. 4 is a plan of the under side of the bar after some of the shoes have been punched from it, and showing the shoes next to be punched in dotted lines. Fig. 5 is a vertical longitudinal mid-section of the punching-dies with the bar being worked. Fig. 6 is a plan of the lower or female die. Fig. 7 is a plan of the under side of the shoe as it is first stamped out. Fig. 8 is a plan of the upper side of the same, and Fig. 9 is a plan of the under side of the finished shoe. Fig. 10 is a transverse section of the bar, cut on the line 10 10 in Fig. 3; and Fig. 11 is a similar transverse section of the finished shoe. Fig. 12 is a fragmentary front elevation of the rolls for rolling the bar. The remaining figures illustrate modifications. Figs. 13, 14, 15, and 16 are plan views corresponding to Fig. 4, and showing four modified constructions of bars. Fig. 17 is a side elevation of the shoe cut from the bar shown in Fig. 16.

I will first describe the preferred method of practicing my invention with reference to Figs. 1 to 12 of the drawings.

The rolled bar A (shown in Figs 1, 2, and 3) is first made. It is of all iron or all steel, or of combined iron and steel. I prefer to use a bar of combined iron and steel made according to my application for patent on "improvements in bars of combined iron and steel and their manufacture," executed this day, application No. 150,778, filed December 19, 1884. Such a bar is passed between rolls of the character illustrated in Figs. 8 and 9 of my said application, modified, however, as shown in Fig. 12 of the accompanying drawings, in order to form concaves on the top of the bar. Referring to Fig. 12, E is the upper roll, for rolling the upper sides of the bar, and F is the lower roll, for rolling the lower side of the bar, with the projecting calks. The roll F has grooves or indentations *f f* for forming the calks, and the roll E is formed on its surface with slightly-projecting portions *e e*, having beveled edges *e' e'* for forming the concaves. The thick plain bar is passed once between these rolls, being thus reduced in thickness, except at the calks or projections, which are left standing.

Referring to Figs. 1 to 4, A is the rolled bar or plate. B B are transverse ribs or projections thereon to form the calks of the shoes, and *a a* are the concaves, which are on the opposite side from the calk projections. The ribs B B are each divided by spaces *b b* into three separate portions, an elongated middle projection, *c*, and two short side projections, *d d*. The projections *c c* are to form the toe-calks of the shoes, and the projections *d d* are to form the heel-calks. For convenience I shall refer to these projections as the calks.

The concaves *a a* are crescent-shaped depressions in the upper side of the bar, sloping downward from their outer edges toward their inner edges, as best shown in Fig. 10. The middle portion, *a'*, may be of the same thickness as the adjacent portions of the plate or bar; but it is preferable to make it as thin as possible, because this portion of the bar is punched out and constitutes waste or scrap, and it is desirable that the waste shall contain as little metal as possible. A comparison of Figs. 10 and 11 will show the relation which the concave in the bar has to the concave in the finished shoe.

The bar A having been prepared, the second step in the manufacture is to punch out the shoes from this bar by means of the dies C and D, shown in Fig. 5. C is the upper or male die or punch, and D is the lower or female die. The shape of the opening in the female die is clearly shown in Fig. 6. It is identical with that of the finished shoe, except that the heel portions are spread wider apart, and at the toe is formed a slight enlargement, *g*. This die has raised side flanges, *h h*, serving as guides to the bar, and is formed with transverse grooves *i i* to receive the ribs or calk projections B B on the bar A. The operator feeds the bar to the punching-press in the manner shown in Fig. 5, the ribs B B entering the grooves *i i*, and thereby serving to gage the position of the bar and prevent its being misplaced. When the operator has the bar in the correct position, he will cause the die C to descend and cut out the shoe. When the die has again ascended, the operator will lift the bar out of the grooves and feed it along the distance between two successive ribs, B B, when he will repeat the operation. The unfinished shoe or blank thus cut out is shown in Figs. 7 and 8, and lettered G. It is provided with solid calks, the toe-calks *c*, and heel-calks *d d*, precisely as in the bar before the blank was punched out; and it has also the concave *a* ready formed in it. To transform it into the finished shoe shown in Fig. 9, it needs only to have its heels pressed together, the creases *k k*, Fig. 9, formed in it, the toe-clip *j*, Fig. 11, struck up, and the nail-holes punched. The first three of these operations may all be performed at one time by means of the machine disclosed in my application for patent on "improvements in horseshoe-machines," executed by me this day, application No. 151,134, filed December 26, 1884. The shoe on being placed in this machine is first grasped by lateral jaws which press its heels toward each other against a central former and hold it firmly. It then passes beneath rotary creasing-dies, which form the undercut creases. It then encounters a swaging-roller, which strikes the end portion, *g'*, upwardly and forms it into the toe-clip *j*, and the shoe is then dropped out.

I consider this machine the best for these purposes; but any other known or suitable machine or machines may be used without departing from my present invention, and the three operations may be performed at one time by one machine or at separate times by different machines, or by hand-tools in any of the known ways. The final operation is the punching of the nail-holes, which may be done by means of any suitable punching-press.

My improved method of making horseshoes has the important advantage of being cheap to work, reducing the number of operations to the minimum, and making, as I believe, a better shoe than has been before made by machinery. There are but three operations— the rolling of the bar, the punching of the blanks, and the passing of the latter through the said horseshoe-machine—required to complete the shoe, with the exception of punching the nail-holes. The metal is not subjected to strain, as when the shoes are bent from straight bars, and the grain or fiber of the metal extends longitudinally of the shoe, instead of transversely, as in the shoes heretofore made by stamping out a bent blank from a rolled bar. The only portion of the shoe wherein the grain of the metal extends transversely to its outline is the toe portion, and this is strengthened by being formed with the deep toe-calk *c* crossing it transversely of the grain.

Fig. 13 shows a bar wherein the transverse ribs B B are continuous, instead of being divided into calks. The shoes are punched out as shown, the toe of one shoe and the heels of the next both coming out of the same rib, which forms the calks on both. The heels of the shoes are here shown nearer together, so that the shoe will not require to be closed together in the creasing-machine.

Fig. 14 shows a plate for forming shoes having intermediate calks or projections, *l l*, between the toe-calk and heel-calks. The bar is rolled with the several projections *c*, *d d*, and *l l*, arranged in the relative positions which they are desired to occupy in the finished shoe, and the blanks are punched out in the manner shown.

Fig. 15 shows a double row of shoe-blanks cut from one bar, which is rolled with toe-calks *c c* and heel-calks *d d* standing in the proper relative positions.

Figure 1:
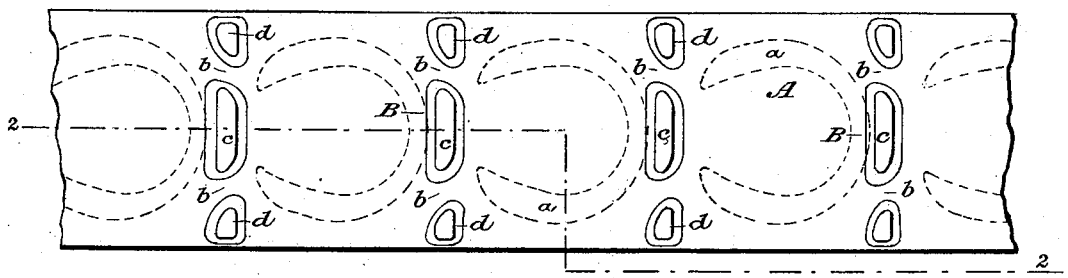
Figure 2:
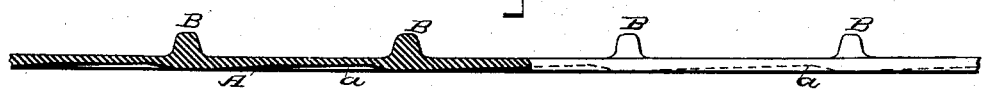
Figure 3:
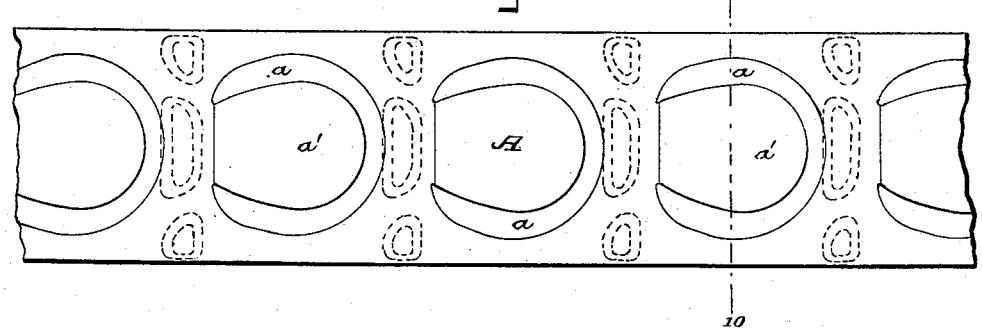
Figure 4:
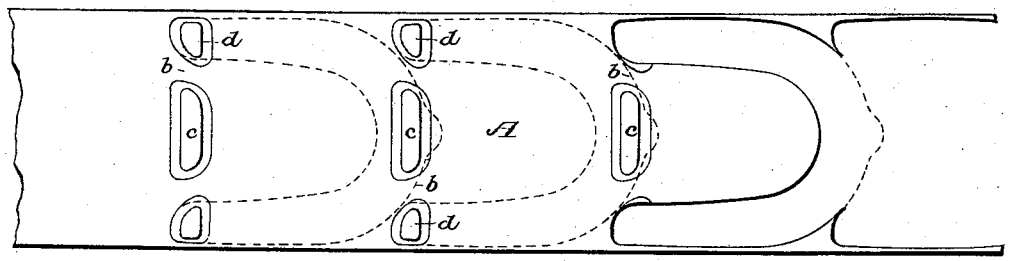

Fig. 16 shows a modified form of the ribbed plate, (shown in Fig. 13,) the ribs being mere beveled edges, rising on a gentle incline on one side and falling off abruptly on the other. The shoe made from this plate has very low calks. It is shown in side view in Fig. 17.

I make no claim in this application to anything claimed in either of my applications for patents hereinbefore referred to, nor in my applications executed this day for patents on "improvements in the manufacture of horseshoes of combined iron and steel," application No. 150,779, filed December 19, 1884, and "improvements in horseshoes," application No. 151,042, filed December 23, 1884; but What I do claim, and desire to secure by Letters Patent, is—

1. The improved method of manufacturing horseshoes, which consists in rolling a bar or plate of metal with transverse projecting ribs or calks relatively arranged to form the respective calks on the shoe, and punching the shoes from such bar with the grain of the metal extending longitudinally of the shoes, substantially as set forth.

2. The improved method of manufacturing horseshoes, which consists in rolling a bar or plate of metal with transverse projecting ribs or calks relatively arranged to form the respective toe and heel calks on the shoes, and punching the shoes successively from such bar with the toe of each shoe between the heels of the next, substantially as set forth.

3. The improved method of manufacturing horseshoes, which consists in rolling a bar or plate of metal with transverse toe-calks *c c* and separate heel-calks *d d* projecting from its surface, relatively arranged to form the respective toe and heel calks on the shoes, and punching the shoes from said bar in such relation, as described, that each shoe punched out shall be provided with a toe-calk at its toe and heel-calks on its heels, substantially as set forth.

4. The improved method of manufacturing horseshoes, which consists in punching the shoes from a bar having transverse ribs or calks with the heels of the shoes spread apart, and subsequently pressing the sides of the shoes toward each other to the desired shape, substantially as set forth.

5. The improved method of manufacturing horseshoes, which consists in rolling a bar or plate with transverse projections at intervals, and with a succession of concaves, *a a*, and punching out shoes from such plate in such positions that the concaves *a a* shall appear on the upper inner side of each shoe, substantially as set forth.

In witness whereof I have hereunto signed my name in the presence of two subscribing witnesses.

LOUIS G. CLAUDE.

Witnesses:
ARTHUR C. FRASER,
HENRY CONNETT.